US012612423B2

(12) United States Patent
Ermert et al.

(10) Patent No.: US 12,612,423 B2
(45) Date of Patent: Apr. 28, 2026

(54) COMPOUNDS AND PROCESSES FOR EXTREME ULTRAVIOLET LITHOGRAPHY

(71) Applicant: ENTEGRIS, INC., Billerica, MA (US)

(72) Inventors: David M. Ermert, Danbury, CT (US); Thomas M. Cameron, Newtown, CT (US)

(73) Assignee: Entegris, Inc., Billerica, MA (US)

( * ) Notice: Subject to any disclaimer, the term of this patent is extended or adjusted under 35 U.S.C. 154(b) by 392 days.

(21) Appl. No.: 18/216,395

(22) Filed: Jun. 29, 2023

(65) Prior Publication Data

US 2024/0002412 A1 Jan. 4, 2024

Related U.S. Application Data

(60) Provisional application No. 63/357,771, filed on Jul. 1, 2022.

(51) Int. Cl.
*C07F 7/22* (2006.01)
*C07F 17/00* (2006.01)

(52) U.S. Cl.
CPC .......... *C07F 7/2284* (2013.01); *C07F 7/2224* (2013.01)

(58) Field of Classification Search
CPC ............................... C07F 7/2284; C07F 17/00
See application file for complete search history.

(56) References Cited

U.S. PATENT DOCUMENTS

| | | | | |
|---|---|---|---|---|
| 2022/0002323 A1* | 1/2022 | Ermert | .................. | C07F 7/2284 |
| 2022/0005687 A1 | 1/2022 | Liu | | |
| 2023/0126125 A1* | 4/2023 | Ermert | .................. | G03F 7/0042 430/270.1 |

FOREIGN PATENT DOCUMENTS

| | | | |
|---|---|---|---|
| JP | 2021025121 | A | 2/2021 |
| KR | 20200018079 | A | 2/2020 |
| TW | 202115096 | A | 4/2021 |
| WO | 2021038523 | A1 | 3/2021 |
| WO | 2021058986 | A1 | 4/2021 |
| WO | 202206501 | A1 | 1/2022 |

OTHER PUBLICATIONS

T. J. Boyle, et al, 41 Dalton Trans., 9349-9364, (2012) (Year: 2012).*

A. J. Edwards, et al, 10, Journal of the Chemical Society, Dalton Transactions, 1587-1591 (1995) (Year: 1995).*

CAS—SciFinder for the Boyle compounds (Year: 2012).*

Kim et al., Atomic Layer Deposition of Tin Monosulfide Using Vapor from Liquid Bis(N,N'-diisopropylformamidinato) tin(II) and H2S, ACS Applied Materials & Interfaces, vol. 11, pp. 45892-45902, 2019.

Ochiai et al., Synthesis of a cyclopentadienyl(imino)stannylene and its direct conversion into halo(imino) stannylenes, RSC advances, vol. 7, pp. 801-804, 2017.

* cited by examiner

*Primary Examiner* — Alexander R Pagano
*Assistant Examiner* — Frank S. Hou

(57) ABSTRACT

The present disclosure includes the preparation of mixed-ligand compounds, such as tin(II) cyclopentadienylide complexes. The compounds of the present disclosure can be used as atomic layer deposition (ALD) precursors for extreme ultraviolet (EUV) lithography. The compounds of the present disclosure can also be used as plasma chemical vapor deposition (CVD) precursors for EUV lithography.

11 Claims, 5 Drawing Sheets

200

300

600

COMPOUNDS AND PROCESSES FOR EXTREME ULTRAVIOLET LITHOGRAPHY

PRIORITY CLAIM

The present disclosure claims priority to U.S. provisional patent application No. 63/357,771 with a title of "COMPOUNDS AND PROCESSES FOR EXTREME ULTRAVIOLET LITHOGRAPHY" and a filing date of Jul. 1, 2023, which document is incorporated by reference herein.

FIELD

The present disclosure relates to the field of compounds and processes for extreme ultraviolet (EUV) lithography.

BACKGROUND

Extreme ultraviolet lithography is an optical lithography technology using a range of extreme ultraviolet wavelengths to produce a pattern by exposing reflective photomask to UV light which gets reflected onto a substrate covered by photoresist.

SUMMARY

The present disclosure includes the preparation of mixed-ligand compounds, such as tin(II) cyclopentadienylide complexes. The compounds of the present disclosure can be used as precursors, e.g., atomic layer deposition (ALD) precursors or plasma chemical vapor deposition (CVD) precursors for EUV lithography. For example, the compounds of the present disclosure can be used for EUV hard mask applications. The tin compounds can be used in other applications as well (e.g., polyvinyl chloride (PVC) stabilizers, biocides, precursors for tin(IV) oxide coatings, and catalysts for organic transformations).

In some embodiments, the present disclosure includes a cyclopentadienylide tin(II) compound of formula (I) comprising:

(I)

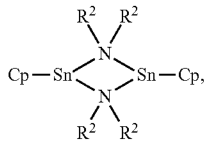

wherein each $R^2$ is independently hydrogen, a $C_1$-$C_4$ alkyl, or a halide containing $C_1$-$C_4$alkyl, wherein

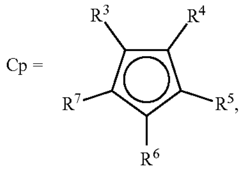

and wherein $R^3$-$R^7$ is hydrogen or $C_1$-$C_4$.

In some embodiments, the present disclosure includes wherein each $R^2$ is independently a methyl, ethyl, propyl, isopropyl, n-butyl, isobutyl, t-butyl, or sec-butyl group.

In some embodiments, the present disclosure includes wherein each $R^2$ is a methyl group.

In some embodiments, the present disclosure includes wherein each $R^2$ is a $C_1$-$C_4$ alkyl group.

In some embodiments, the present disclosure includes wherein the $C_1$-$C_4$ is unbranched.

In some embodiments, the present disclosure includes wherein each $R^3$-$R^7$ is hydrogen.

In some embodiments, the present disclosure includes wherein each $R^2$ is hydrogen and each $R^3$-$R^7$ is hydrogen.

In some embodiments, the present disclosure includes a method of forming a cyclopentadienylide tin(II) compound of formula (I):

(I)

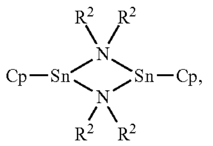

wherein each $R^2$ is independently hydrogen, a $C_1$-$C_4$ alkyl, or a halide containing $C_1$-$C_4$ alkylgroup, wherein

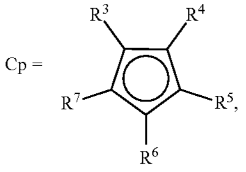

wherein $R^3$-$R^7$ is hydrogen or $C_1$-$C_4$, and wherein the method comprises: contacting $[Sn(N(R^2)_2)_2]_2$ with $Cp_2Sn$ or CpH.

In some embodiments, the present disclosure includes wherein $[Sn(N(R^2)_2)_2]_2$ is dissolved in tetrahydrofuran before the contacting step.

In some embodiments, the present disclosure includes wherein $R^2$ is independently a methyl, ethyl, propyl, isopropyl, n-butyl, isobutyl, t-butyl, or sec-butyl group.

In some embodiments, the present disclosure includes wherein $Cp_2Sn$ or CpH is dissolved in tetrahydrofuran before the contacting step.

In some embodiments, the present disclosure includes a cyclopentadienylide tin(II) compound of formula (II):

(II)

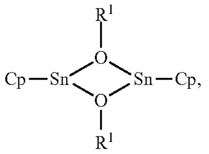

wherein each $R^1$ is independently hydrogen, $C_1$-$C_4$ alkyl, or a halide containing $C_1$-$C_4$ alkyl, and wherein

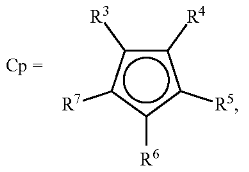

and wherein $R^3$-$R^7$ is hydrogen or $C_1$-$C_4$ alkyl.

In some embodiments, the present disclosure includes wherein each $R^1$ is independently a methyl, ethyl, propyl, isopropyl, n-butyl, isobutyl, t-butyl, or sec-butyl group.

In some embodiments, the present disclosure includes wherein each $R^1$ is a methyl group.

In some embodiments, the present disclosure includes wherein each $R^1$ is a $C_1$-$C_4$ alkyl group.

In some embodiments, the present disclosure includes wherein the $C_1$-$C_4$ alkyl is unbranched.

In some embodiments, the present disclosure includes wherein each $R^3$-$R^7$ is hydrogen.

In some embodiments, the present disclosure includes wherein each $R^1$ is hydrogen and each $R^3$-$R^7$ is hydrogen.

In some embodiments, the present disclosure includes a method of forming a cyclopentadienylide tin(II) compound of formula (II):

(II)

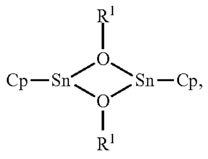

wherein each $R^1$ is independently hydrogen, a $C_1$-$C_4$ alkyl, or a halide containing $C_1$-$C_4$ alkylgroup, wherein

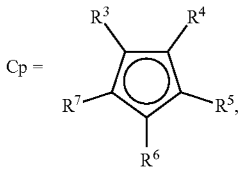

wherein $R^3$-$R^7$ is hydrogen or $C_1$-$C_4$, and wherein the method comprises: contacting $[Sn(O(R^1))_2]_2$ with $Cp_2Sn$.

In some embodiments, the present disclosure includes wherein $[Sn(O(R^1))_2]_2$ is dissolved in tetrahydrofuran before the contacting step.

In some embodiments, the present disclosure includes wherein $R^1$ is independently a methyl, ethyl, propyl, isopropyl, n-butyl, isobutyl, t-butyl, or sec-butyl group.

In some embodiments, the present disclosure includes wherein $Cp_2Sn$ is dissolved in tetrahydrofuran before the contacting step.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The present disclosure relates to compounds of, including the preparation of, mixed-ligand compounds. The mixed-ligand compounds include tin(II) cyclopentadienylide complexes including cyclopentadienylide amides and cyclopentadienylide alkoxides. The compounds of the present disclosure can be used as atomic layer deposition (ALD) precursors for EUV lithography. For example, the compounds of the present disclosure can be used for EUV hard mask applications. The tin compounds can be used in other applications as well (e.g., polyvinyl chloride (PVC) stabilizers, biocides, precursors for tin(IV) oxide coatings, and catalysts for organic transformations).

Figure 1:
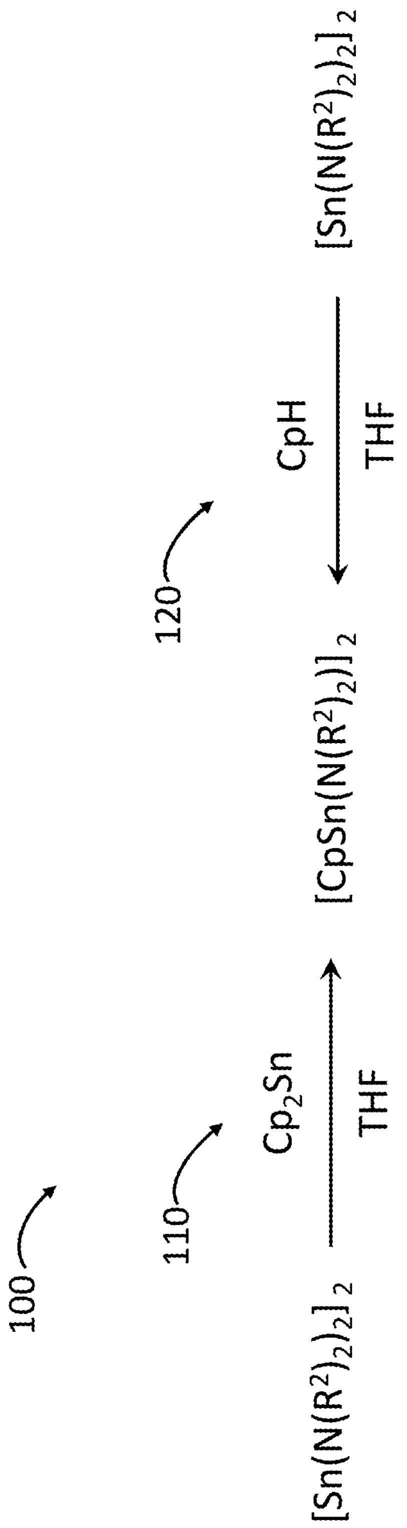
FIG. 1 depicts a non-limiting embodiment of a method 100 for the synthesis of cyclopentadienylide tin(II) amides described herein.

FIG. 1 depicts a non-limiting embodiment of a method 100 for the synthesis of cyclopentadienylide tin(II) amides described herein. In some embodiments, the present disclosure includes contacting $[Sn(N(R^2)_2)_2]_2$ with $Cp_2Sn$ 110 or CpH 120. In some embodiments, the method 100 includes dissolving $[Sn(N(R^2)_2)_2]_2$ in tetrahydrofuran (THF) before the contacting step. In some embodiments, the method 100 includes dissolving $Cp_2Sn$ or CpH in tetrahydrofuran (THF) before the contacting step.

In some embodiments, using $Cp_2Sn$ 110 in the method 100 can include loading $[Sn(N(R^2)_2)_2]_2$ into a container (e.g., a vial) and dissolving in tetrahydrofuran (THF). In a separate container, $Cp_2Sn$ can be added and dissolved in tetrahydrofuran (THF). The solution with $[Sn(N(R^2)_2)_2]_2$ dissolved in THF can then be added to the solution with $Cp_2Sn$ dissolved in THF. The combined solution of $[Sn(N(R^2)_2)_2]_2$, $Cp_2Sn$, and tetrahydrofuran (THF) can be stirred for a period of time. The combined solution can be stirred for an extended period of time, e.g., between one to twelve hours. For example, the combined solution can be stirred for greater than one hour, greater than three hours, greater than six hours, greater than nine hours, less than twelve hours, less than nine hours, less than six hours, or less than three hours. After stirring the combined solution, the combined solution can then be dried. In some examples, the combined solution can be dried under reduced pressure to yield a solid mass. The reduced pressure can be selected from a range of reduced pressures, e.g., 100 mTorr-760 Torr (atm). For example, the reduced pressure can be greater than 100 mTorr, greater than 1 torr, greater than 10 torr, greater than 100 torr, greater than 300 torr, greater than 500 torr, greater than 700 torr, less than 760 torr, less than 700 torr, less than 500 torr, less than 300 torr, less than 100 torr, less than 10 torr, or less than 1 torr. In some examples, the stirred solution can be dried under dynamic vacuum, including at the reduced pressure values described herein. X-ray quality crystals can be grown by slow evaporation of a solution, such as a NMR solvent, including a concentrated benzene ($C_6D_6$) solution, Tetrahydrofuran (THF), diethyl ether ($Et_2O$), or toluene (PhMe).

In some embodiments, using CpH 120 in the method 100 can include diluting cyclopentadiene with tetrahydrofuran (THF). The solution of cyclopentadiene with tetrahydrofuran (THF) can then be added to a stirred solution of THF and $[Sn(N(R^2)_2)_2]_2$. The combined solution of $[Sn(N(R^2)_2)_2]_2$, CpH, and tetrahydrofuran (THF) can be stirred for a period of time. The combined solution can be stirred for an extended period of time, e.g., between one to twelve hours. For example, the combined solution can be stirred for greater than one hour, greater than three hours, greater than six hours, greater than nine hours, less than twelve hours, less than nine hours, less than six hours, or less than three hours. After stirring the combined solution, the combined solution can then be dried. In some examples, the stirred solution can be dried under reduced pressure to yield a solid mass. For example, the reduced pressure can be greater than 100 mTorr, greater than 1 torr, greater than 10 torr, greater than 100 torr, greater than 300 torr, greater than 500 torr, greater than 700 torr, less than 760 torr, less than 700 torr, less than 500 torr, less than 300 torr, less than 100 torr, less than 10 torr, or less than 1 torr. In some examples, the stirred solution can be dried under dynamic vacuum, including at the reduced pressure values described herein.

In some embodiments, using $Cp_2Sn$ 110 or CpH 120 in the method 100 of the present disclosure includes a cyclopentadienylide tin(II) compound of formula (I):

(I)

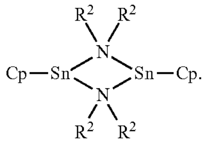

In some embodiments, each $R^2$ is independently hydrogen or $C_1$-$C_4$ alkyl.

In some embodiments, each $R^2$ is independently a methyl, ethyl, propyl, isopropyl, n-butyl, isobutyl, t-butyl, or sec-butyl group. In some embodiments, each $R^2$ is a methyl group. In some embodiments, each $R^2$ is a $C_1$-$C_4$ alkyl group.

In some embodiments, the cyclopentadienylide (Cp) has the formula (1):

(1)

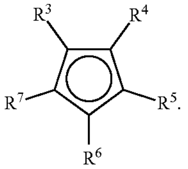

In some embodiments, $R^3$-$R^7$ is hydrogen or $C_1$-$C_4$. In some embodiments, each $R^3$-$R^7$ is independently a methyl, ethyl, propyl, isopropyl, n-butyl, isobutyl, t-butyl, or sec-butyl group. In some embodiments, each $R^2$ is a methyl group.

In some embodiments, the $C_1$-$C_4$ alkyl is branched.

In some embodiments, each $R^2$ is a methyl group and each $R^3$-$R^7$ is hydrogen. In some embodiments, each $R^2$ is hydrogen and each $R^3$-$R^7$ is hydrogen.

In some embodiments, the present disclosure includes forming a cyclopentadienylide tin(II) compound of formula (I). In some embodiments, each $R^2$ is independently hydrogen, a $C_1$-$C_4$ alkyl, or a halide containing $C_1$-$C_4$ alkyl group.

In some embodiments, the cyclopentadienylide (Cp) has the formula (1). In some embodiments, $R^3$-$R^7$ is hydrogen or $C_1$-$C_4$ alkyl. In some embodiments, the method 100 includes forming a cyclopentadienylide tin(II) compound of formula (I) by contacting $[Sn(N(R^2)_2)_2]_2$ with $Cp_2Sn$ or CpH. In some embodiments, the method 100 includes dissolving $[Sn(N(R^2)_2)_2]_2$ in tetrahydrofuran (THF) before the contacting step. In some embodiments, the method 100 includes dissolving $Cp_2Sn$ or CpH in tetrahydrofuran (THF) before the contacting step.

Figure 2:
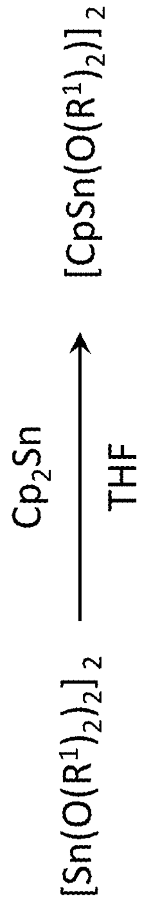
FIG. 2 depicts a non-limiting embodiment of a method 200 for the synthesis of cyclopentadienylide tin(II) alkoxides described herein.

FIG. 2 depicts a non-limiting embodiment of a method 200 for the synthesis of cyclopentadienylide tin(II) alkoxides described herein. In some embodiments, the present disclosure includes contacting $[Sn(O(R^1))_2]_2$ with $Cp_2Sn$. In some embodiments, the method 200 includes dissolving $[Sn(O(R^1))_2]_2$ in tetrahydrofuran (THF) before the contacting step. In some embodiments, the method 200 includes dissolving $Cp_2Sn$ in tetrahydrofuran (THF) before the contacting step.

In some embodiments, using $Cp_2Sn$ in the method 200 of the present disclosure includes a cyclopentadienylide tin(II) compound of formula (II):

(II)

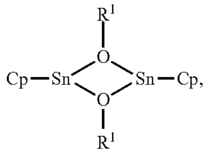

In some embodiments, each $R^1$ is independently hydrogen, a $C_1$-$C_4$, or a halide containing $C_1$-$C_4$ alkyl.

In some embodiments, each $R^1$ is independently a methyl, ethyl, propyl, isopropyl, n-butyl, isobutyl, t-butyl, or sec-butyl group. In some embodiments, each $R^1$ is a methyl group. In some embodiments, each $R^1$ is a $C_1$-$C_4$ alkyl group. In some embodiments, each $R^1$ is a $C_1$-$C_4$ alkyl group that contains at least one halide (e.g., fluorine (F), chlorine (Cl), bromine (Br), or iodine (I)). For example, $R^1$ can be —$OCH_2CF_3$ (trifluoro ethoxide).

In some embodiments, the cyclopentadienylide (Cp) has the formula (1):

(1)

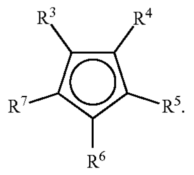

In some embodiments, $R^3$-$R^7$ is hydrogen or $C_1$-$C_4$. In some embodiments, each $R^3$-$R^7$ is independently a methyl, ethyl, propyl, isopropyl, n-butyl, isobutyl, t-butyl, or sec-butyl group. In some embodiments, each $R^1$ is a methyl group.

In some embodiments, the $C_1$-$C_4$ alkyl is unbranched.

In some embodiments, each $R^1$ is a methyl group and each $R^3$-$R^7$ is hydrogen. In some embodiments, each $R^1$ is hydrogen and each $R^3$-$R^7$ is hydrogen.

In some embodiments, the present disclosure includes forming a cyclopentadienylide tin(II) compound of formula (II). In some embodiments, each $R^1$ is independently hydrogen, a $C_1$-$C_4$ alkyl, or a halide containing $C_1$-$C_4$ alkyl group.

In some embodiments, the cyclopentadienylide (Cp) has the formula (1). In some embodiments, $R^3$-$R^7$ is hydrogen or $C_1$-$C_4$. In some embodiments, the method 200 includes forming a cyclopentadienylide tin(II) compound of formula (II) by contacting $[Sn(O(R^1))_2]_2$ with $Cp_2Sn$. In some embodiments, the method 200 includes dissolving $[Sn(O(R^1))_2]_2$ in tetrahydrofuran (THF) before the contacting step. In some embodiments, the method 200 includes dissolving $Cp_2Sn$ in tetrahydrofuran (THF) before the contacting step.

EXAMPLES

Example 1

Figure 3:
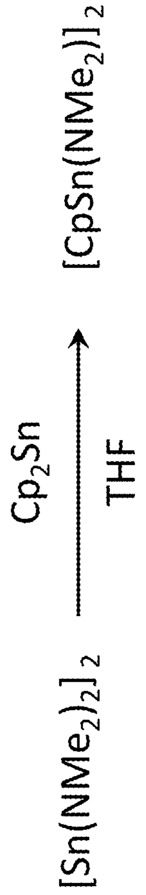
FIG. 3 depicts a non-limiting example of a method 300 for the synthesis of cyclopentadienyl tin(II) amides using $Cp_2Sn$ described herein.

FIG. 3 depicts a non-limiting example of a method 300 for the synthesis of cyclopentadienyl tin(II) amides using $Cp_2Sn$ described herein. $[Sn(N(CH_3)_2)_2]_2$ (1.0 g, 3.98 mmol) was loaded into an amber 40 mL vial and dissolved in tetrahydrofuran (10 mL). $Cp_2Sn$ was loaded into a separate amber 40 mL vial equipped with a magnetic stir bar and dissolved in THF (10 mL). The $[Sn(N(CH_3)_2)_2]_2$ solution was added to the $Cp_2Sn$ solution with stirring over the course of five minutes. The resulting pale-yellow solution was stirred overnight at room temperature. The next day the pale-yellow solution was dried under reduced pressure to yield $[CpSn(N(CH_3)_2)]_2$ as an off-white/yellow solid (Mass: 1.63 g, Yield: 89.5%). X-ray quality crystals were grown by slow evaporation of a concentrated $C_6D_6$ solution. $^1H$-NMR (400 MHz, $d_8$-THF, 298K): 2.65 (s, 6H); 2.73 (s, 6H); 6.12 (s, 10H) ppm; $^{13}C\{^1H\}$-NMR (100 MHz, $d_8$-THF, 298K): 44.06 ppm; $^{119}Sn\{^1H\}$-NMR (149 MHz, $d_8$-THF, 298K): −287.3, −306.12 ppm.

Figure 4:
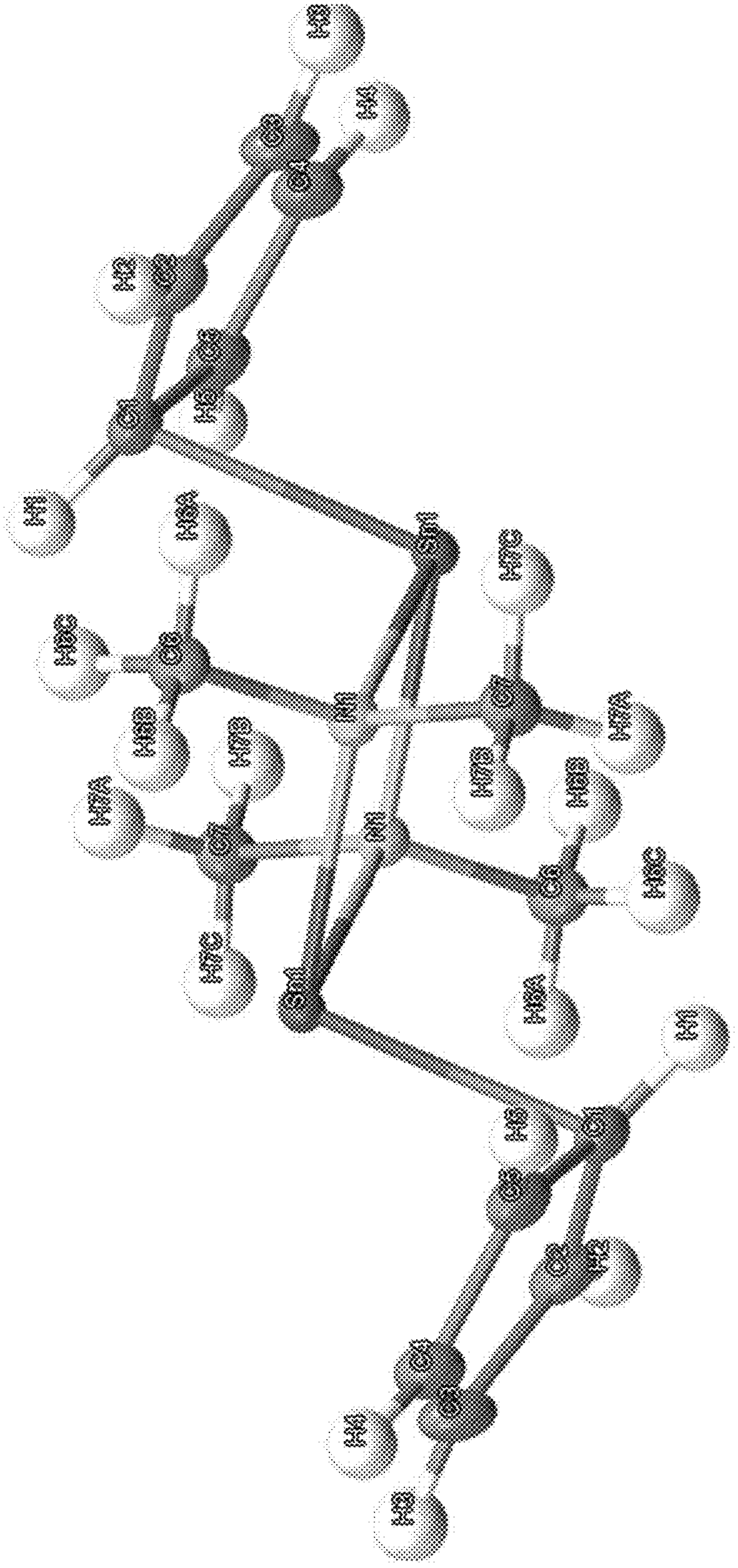
FIG. 4 depicts a solid-state structure of $[CpSn(N(CH_3)_2)]_2$ as determined by X-ray crystallographic analysis.

FIG. 4 depicts a solid-state structure of $[CpSn(N(CH_3)_2)]_2$ as determined by X-ray crystallographic analysis.

Table 1 depicts crystal data and structure refinement for $[CpSn(N(CH_3)_2)]_2$.

| | |
|---|---|
| Empirical formula | C20 H22 D6 N2 Sn2 |
| Molecular formula | C14 H22 N2 Sn2, C6 D6 |
| Formula weight | 539.86 |
| Temperature | 100.00 K |
| Wavelength | 0.71073 Å |
| Crystal system | Triclinic |
| Space group | P-1 |
| Unit cell dimensions | a = 5.7015(2) Å; α = 109.2680(10)°<br>b = 8.8255(2) Å; β = 90.5790(10)°<br>c = 11.3321 (3) Å; γ = 106.5100(10)° |
| Volume | 512.67(3) $Å^3$ |
| Z | 1 |
| Density (calculated) | 1.749 $Mg/m^3$ |
| Absorption coefficient | 2.440 $mm^{-1}$ |
| F(000) | 262 |
| Crystal size | 0.18 × 0.16 × 0.11 $mm^3$ |
| Crystal color, habit | colorless block |
| Theta range for data collection | 2.567 to 26.365° |
| Index ranges | −7 <= h <= 7, −11 <= k <= 11, −14 <= l <= 14 |
| Reflections collected | 16961 |
| Independent reflections | 2079 [R(int) = 0.0308] |
| Completeness to theta = 25.242° | 99.9% |
| Absorption correction | None |
| Max. and min. transmission | 0.2607 and 0.2204 |
| Refinement method | Full-matrix least-squares on $F^2$ |
| Data/restraints/parameters | 2079/0/115 |
| Goodness-of-fit on $F^2$ | 1.119 |
| Final R indices [I > 2sigma(I)] | R1 = 0.0107, wR2 = 0.0267 |
| R indices (all data) | R1 = 0.0109, wR2 = 0.0268 |
| Extinction coefficient | 0.0049(8) |
| Largest diff. peak and hole | 0.315 and −0.280 $e.Å^{-3}$ |

Example 2

Figure 5:
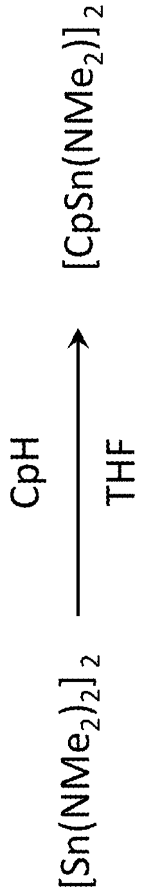
FIG. 5 depicts a non-limiting example of a method 600 for the synthesis of cyclopentadienyl tin(II) amides using CpH described herein.

FIG. 5 depicts a non-limiting example of a method 600 for the synthesis of cyclopentadienyl tin(II) amides using CpH described herein.

Cyclopentadiene (0.158 g, 2.40 mmol) was diluted with 3 mL of tetrahydrofuran and added dropwise over the course of five minutes to a stirred 3 mL THF solution of $[Sn(N(CH_3)_2)_2]_2$ (0.500 g, 1.20 mmol) and the resulting pale-yellow solution stirred overnight. The next day the volatiles were removed under reduced pressure to yield $[CpSn(N(CH_3)_2)]_2$ as a pale-yellow solid. $^1H$—, $^{13}C$—, and $^{119}Sn$-NMR collected on a $d_8$-THF solution of the product are consistent with that obtained by combining $Cp_2Sn$ and $[Sn(N(CH_3)_2)_2]_2$.

ASPECTS

Various Aspects are described below. It is to be understood that any one or more of the features recited in the following Aspect(s) can be combined with any one or more other Aspect(s).

Aspect 1. A cyclopentadienylide tin(II) compound of formula (I) comprising:

(I)

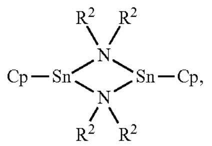

wherein each $R^2$ is independently hydrogen, a $C_1$-$C_4$, or a halide containing $C_1$-$C_4$, wherein

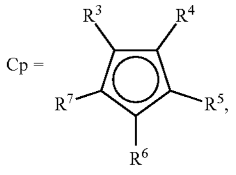

and wherein $R^3$-$R^7$ is hydrogen or $C_1$-$C_4$.

Aspect 2. The compound of Aspect 1, wherein each $R^2$ is independently a methyl, ethyl, propyl, isopropyl, n-butyl, isobutyl, t-butyl, or sec-butyl group.

Aspect 3. The compound of Aspect 1, wherein each $R^2$ is a methyl group.

Aspect 4. The compound of Aspect 1, wherein each $R^2$ is a $C_1$-$C_4$alkyl group.

Aspect 5. The compound as in any one of the preceding Aspects, wherein the $C_1$-$C_4$ is branched or unbranched.

Aspect 6. The compound as in any one of the preceding Aspects, wherein the $C_1$-$C_4$ is substituted or unsubstituted.

Aspect 7. The compound as in any one of the preceding Aspects, wherein each $R^3$-$R^7$ is hydrogen.

Aspect 8. The compound of Aspect 1, wherein each $R^2$ is hydrogen and each $R^3$-$R^7$ is hydrogen.

Aspect 9. A method of forming a cyclopentadienylide tin(II) compound of formula (I):

(I)

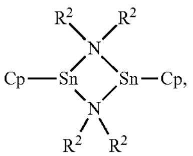

wherein each $R^2$ is independently hydrogen, a $C_1$-$C_4$, or a halide containing $C_1$-$C_4$ group, wherein

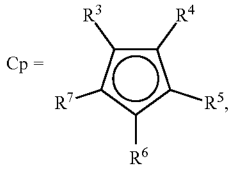

wherein $R^3$-$R^7$ is hydrogen or $C_1$-$C_4$, and wherein the method comprises: contacting $[Sn(N(R^2)_2)_2]_2$ with $Cp_2Sn$ or CpH.

Aspect 10. The method of Aspect 9, wherein $[Sn(N(R^2)_2)_2]_2$ is dissolved in tetrahydrofuran before the contacting step.

Aspect 11. The method of Aspect 9 or Aspect 10, wherein $R^2$ is independently a methyl, ethyl, propyl, isopropyl, n-butyl, isobutyl, t-butyl, or sec-butyl group.

Aspect 12. The method as in one of Aspects 9-11, wherein $Cp_2Sn$ or CpH is dissolved in tetrahydrofuran before the contacting step.

Aspect 13. A cyclopentadienylide tin(II) compound of formula (II):

(II)

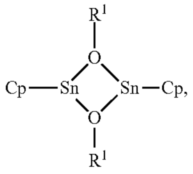

wherein each $R^1$ is independently hydrogen, $C_1$-$C_4$, or a halide containing $C_1$-$C_4$, and wherein

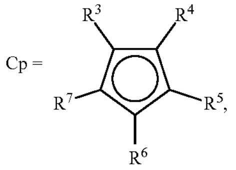

and wherein $R^3$-$R^7$ is hydrogen or $C_1$-$C_4$.

Aspect 14. The compound of Aspect 13, wherein each $R^1$ is independently a methyl, ethyl, propyl, isopropyl, n-butyl, isobutyl, t-butyl, or sec-butyl group.

Aspect 15. The compound of Aspect 13, wherein each $R^1$ is a methyl group.

Aspect 16. The compound of Aspect 13, wherein each $R^1$ is a $C_1$-$C_4$alkyl group.

Aspect 17. The compound as in any one of the preceding Aspects, wherein the $C_1$-$C_4$ is branched or unbranched.

Aspect 18. The compound as in any one of the preceding Aspects, wherein the $C_1$-$C_4$ is substituted or unsubstituted.

Aspect 19. The compound as in any one of the preceding Aspects, wherein each $R^3$-$R^7$ is hydrogen.

Aspect 20. The compound of Aspect 13, wherein each $R^1$ is hydrogen and each $R^3$-$R^7$ is hydrogen.

Aspect 21. A method of forming a cyclopentadienylide tin(II) compound of formula (II):

(II)

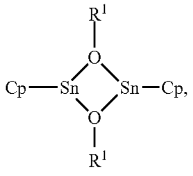

wherein each $R^1$ is independently hydrogen, a $C_1$-$C_4$, or a halide containing $C_1$-$C_4$ group, wherein

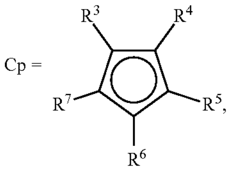

wherein $R^3$-$R^7$ is hydrogen or $C_1$-$C_4$, and wherein the method comprises: contacting $[Sn(O(R^1))_2]_2$ with $Cp_2Sn$.

Aspect 22. The method of Aspect 21, wherein $[Sn(O(R^1))_2]_2$ is dissolved in tetrahydrofuran before the contacting step.

Aspect 23. The method of Aspect 21 or Aspect 22, wherein $R^1$ is independently a methyl, ethyl, propyl, isopropyl, n-butyl, isobutyl, t-butyl, or sec-butyl group.

Aspect 24. The method as in one of Aspects 21-23, wherein $Cp_2Sn$ is dissolved in tetrahydrofuran before the contacting step.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A cyclopentadienylide tin(II) compound of formula (I) comprising:

(I)

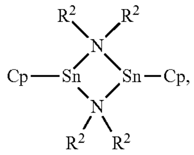

wherein each $R^2$ is independently hydrogen, a $C_1$-$C_4$ alkyl group, or a halide containing $C_1$-$C_4$ alkyl group, wherein

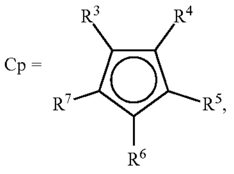

and wherein $R^3$-$R^7$ is hydrogen or $C_1$-$C_4$ alkyl group.

2. The compound of claim 1, wherein each $R^2$ is independently a methyl, ethyl, propyl, isopropyl, n-butyl, isobutyl, t-butyl, or sec-butyl group.

3. The compound of claim 1, wherein each $R^2$ is a methyl group.

4. The compound of claim 1, wherein each $R^2$ is a $C_1$-$C_4$alkyl group.

5. The compound of claim 1, wherein the $C_1$-$C_4$ alkyl group is branched or unbranched.

6. The compound of claim 1, wherein each $R^3$-$R^7$ is hydrogen.

7. The compound of claim 1, wherein each $R^2$ is hydrogen and each $R^3$-$R^7$ is hydrogen.

8. A method of forming a cyclopentadienylide tin(II) compound of formula (I):

(I)

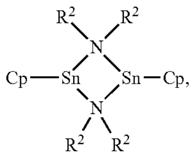

wherein each $R^2$ is independently hydrogen, a $CC_1$-$C_4$ alkyl group, or a halide containing $C_1$-$C_4$ alkyl group, wherein

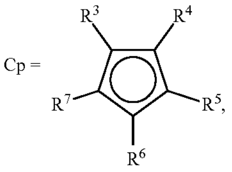

wherein $R^3$-$R^7$ is hydrogen or $C_1$-$C_4$ alkyl group, and wherein the method comprises: contacting $[Sn(N(R^2)_2)_2]_2$ with $Cp_2Sn$ or CpH.

9. The method of claim 8, wherein $[Sn(N(R^2)_2)_2]_2$ is dissolved in tetrahydrofuran before the contacting step.

10. The method of claim 9, wherein $R^2$ is independently a methyl, ethyl, propyl, isopropyl, n-butyl, isobutyl, t-butyl, or sec-butyl group.

11. The method of claim 8, wherein $Cp_2Sn$ or CpH is dissolved in tetrahydrofuran before the contacting step.

* * * * *